United States Patent
Stummer

(10) Patent No.: US 9,677,535 B2
(45) Date of Patent: Jun. 13, 2017

(54) PUMP TURBINE PLANT

(75) Inventor: Manfred Stummer, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 834 days.

(21) Appl. No.: 14/122,218

(22) PCT Filed: May 11, 2012

(86) PCT No.: PCT/EP2012/002051
§ 371 (c)(1),
(2), (4) Date: Jan. 10, 2014

(87) PCT Pub. No.: WO2012/175165
PCT Pub. Date: Dec. 27, 2012

(65) Prior Publication Data
US 2014/0161586 A1      Jun. 12, 2014

(30) Foreign Application Priority Data

Jun. 22, 2011  (DE) .................. 10 2011 105 685

(51) Int. Cl.
*F03B 3/10*       (2006.01)
*F03B 13/06*      (2006.01)

(52) U.S. Cl.
CPC ............... *F03B 3/10* (2013.01); *F03B 3/106* (2013.01); *F03B 13/06* (2013.01); *Y02E 10/22* (2013.01); *Y02E 10/223* (2013.01); *Y02E 60/17* (2013.01)

(58) Field of Classification Search
CPC .. F03B 3/10; F03B 3/106; F03B 13/06; Y02E 10/22; Y02E 10/223; Y02E 60/17; F05B 2220/32

(Continued)

(56) References Cited

U.S. PATENT DOCUMENTS 3,214,915 A  *  11/1965  Weibel .................... F03B 13/06
                                                                    415/123
3,891,860 A  *   6/1975  Hutarew ................. F03B 13/06
                                                                    290/52

(Continued)

FOREIGN PATENT DOCUMENTS

AT      006 970       6/2004
CH      434 981       4/1967

(Continued)

OTHER PUBLICATIONS

English machine translation of DE 587694, Nov. 7, 1933.*

(Continued)

*Primary Examiner* — Christopher Verdier
(74) *Attorney, Agent, or Firm* — Farjami & Farjami LLP

(57) ABSTRACT

There is provided a method of operating a pump turbine plant including a turbine with a turbine impeller and a turbine spiral casing having a first pressure pipe, and a pump with a pump impeller and a pump spiral casing having a second pressure pipe; an electrical machine dynamically in a drive connection with a shaft, the pump turbine plant further including a hydraulic short-circuit that can be created between the turbine and the pump, wherein the turbine has a greater rated power than the pump, and wherein the turbine and the pump operate under partial load at least temporarily in the hydraulic short-circuit. The method further includes operating the turbine or the pump in the hydraulic short-circuit when a degree of efficiency of the pump and of the turbine in the hydraulic short-circuit is greater than a degree of efficiency of the turbine on its own.

7 Claims, 4 Drawing Sheets

(58) Field of Classification Search
USPC .................................... 415/1, 3.1, 906, 910
See application file for complete search history.

(56) References Cited

U.S. PATENT DOCUMENTS

| | | | | |
|---|---|---|---|---|
| 4,344,735 A | * | 8/1982 | Tsunoda .................. | F03B 3/103 |
| | | | | 415/1 |
| 5,886,417 A | * | 3/1999 | Oka ........................ | F01D 15/10 |
| | | | | 290/52 |

FOREIGN PATENT DOCUMENTS

| DE | 587 694 | 11/1933 |
|---|---|---|
| DE | 606 894 | 12/1934 |
| DE | 195 34 786 | 3/1996 |
| DE | 10 2004 013 907 | 11/2004 |
| JP | 2001-271736 | 10/2001 |

OTHER PUBLICATIONS

English machine translation of CH 434981, Apr. 30, 1967.*
English machine translation of JP 2001-271736, Oct. 5, 2001.*
English machine translation of DE 10 2004 013 907, Nov. 4, 2004.*
English machine translation of AT 006 970, Jun. 25, 2004.*
English machine translation of DE 606894, Dec. 13, 1934.*
International Preliminary Report on Patentability in PCT Application No. PCT/EP2012/002051 dated Jan. 16, 2014.

* cited by examiner

PUMP TURBINE PLANT

This is a U.S. national phase application, which is based on, and claims priority from, PCT application Serial No. PCT/EP2012/002051, filed May 11, 2012, which claims priority from foreign application Serial No. 10 2011 105 685.1, filed Jun. 22, 2011, in Germany.

The invention concerns a pump turbine plant. Moreover, the invention concerns a method of operating a pump turbine plant during the operation of the turbine.

Turbines like Francis- or Pelton turbines can be contemplated. Moreover, the pump as well as the turbine can be designed with one or several stages, so that combinations of a single-stage turbine can be envisaged with a several-stage pump, or several-stage turbines with a single or several-stage pump.

Pump turbine plants of pumped-storage power plants have two operating modes, namely a turbine mode or a pump mode. In the latter operation, the pump does pump water from a lower reservoir into an upper reservoir and is therefore driven by an electrical machine which is in driving connection with the pump. The electrical machine is hence fed by a public electrical grid, i.e. supplied with electrical power.

During the operation of the turbine conversely, the water flowing out of the upper reservoir through the turbine into the lower reservoir drives the turbine, which transmits a corresponding power to the electrical machine. The electrical machine converts the drive power into electrical power and feeds in into the power supply grid. The electrical machine thus operates once as a generator and once as a motor. It is therefore designated as a motor-generator.

In contrast to the aforesaid generic pump turbine plants, reversible pump turbine plants have also become known, in which the turbine and pump are formed by a common impeller so that during the operation of the turbine the common impeller is acted upon with water from the upper reservoir to generate electrical power and during the operation of the pump it is driven by the electrical machine.

Since such pumped-storage power plants are used to compensate for load peaks in the power supply grid, the pump turbine must be put into a position as rapidly as possible to deliver turbine power so as to support the power supply grid or to rapidly receive pump power which will be used for primary grid regulation. Ideally, the pump turbine of a pumped-storage power plant should hence be put into pumping mode from turbine mode as rapidly as possible and conversely.

Such plants are prone to frequent changes in the volume flow of the water supplied to the turbine. The volume flow can have extreme values, upwards or downwards. The turbine has an optimal degree of efficiency which is obtained near the maximum of the volume flow. When the volume flow is small, the degree of efficiency of the turbine is relatively low. This applies particularly for extreme partial loading. Not only the degree of efficiency decreases under partial load but also the cavitation behaviour also decreases.

The object of the invention is then to design a pump turbine plant in such a way that the problems associated with partial load are avoided. The degree of efficiency of a machine assembly, comprising at least one turbine and at least one pump, must hence be optimal over a larger operating range with respect to known machine assemblies. The degree of efficiency should still be acceptable even with extreme partial load. The cavitation behaviour should be improved. The object of the invention is then to provide an operation of the turbine in a pump turbine plant which is optimised in terms of degree of efficiency.

The main idea of the invention consists in increasing the designed power of the turbine with respect to the designed power of the pump. Moreover, a hydraulic short-circuit must be easy to produce between turbine and pump. Both machines have a spiral housing which is designed in reverse direction. The pressure lines of both spiral housings emerge into a common pipe line.

The generation of the hydraulic short-circuit has the advantage that the turbine can be
run even with a minimal volume flow of the supplied water in an optimal range. It produces a small power indeed, but with a substantially better degree of efficiency than it had been the case with known plants.

In the method according to the invention, it is provided accordingly that turbine and pump are operated under partial load at least temporarily in the hydraulic short-circuit. Such a short-circuit, in turbine mode of the pump turbine plant, enables to optimise the degree of efficiency over the whole rated power range of the turbine thanks to the design using a turbine which has a greater rated power than the pump. The degree of efficiency of turbine and pump, common with the hydraulic short-circuit is then higher than the degree of the turbine in partial load mode alone, in spite of the reduced output in partial load mode. Astute use of the operation either of the turbine alone or of the turbine and of the pump in the hydraulic short-circuit enables to realise an optimal degree of efficiency in turbine mode of the plant over the whole rated power range of the pump turbine plant.

Also, no additional devices or measures are necessary for the extension of the operating range aforementioned, such as for instance for stabilising the run by conveying stabilisation air. Similarly, such additional measures can be applied.

The difference in designed powers of turbines and pump is best selected in such a way that the degree of efficiency of the turbine for a certain partial load and the degree of efficiency of the hydraulic short-circuit are optimal.

The turbine can have a designed power which corresponds to once to twice the designed power of the pump, for instance with a factor 1.1, 1.2, 1.3 and so on to a factor 2.

It is also convenient to equip both hydraulic machines, hence turbine and pump, respectively with an adjustable guide wheel. This provides regulated switching from hydraulic short-circuit mode in turbine mode and vice versa.

The invention can be used perfectly with hydraulic machines (turbine and pump) in a Francis type.

Both hydraulic machines can have respectively a single impeller, but also several impellers. The impellers can be arranged on a common shaft or on different shafts. The invention is described below with reference to the drawing. The following details are shown:

Figure 1:
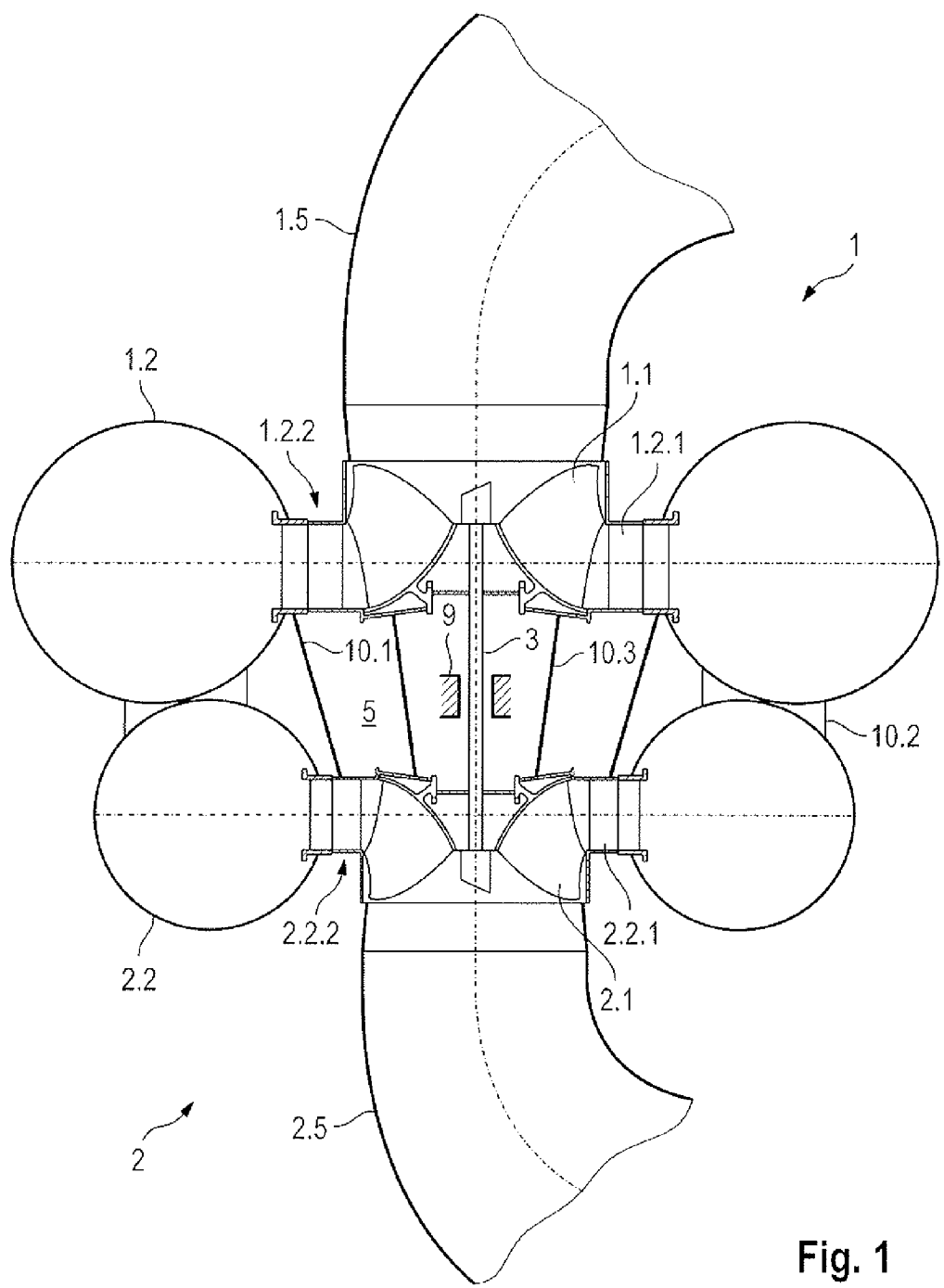
FIG. 1 shows two Francis-type hydraulic machines, the one as a turbine and the other as a pump, in an axial section.

The pump turbine plant shown in FIG. 1 is constructed as follows: The turbine 1 comprises a turbine impeller 1.1, comprising a plurality of guide vanes. The turbine impeller 1.1 is fitted with a shaft 3 in a torque-proof manner and its rotary axis 7 is mounted rotatably. The turbine impeller 1.1 is surrounded by a turbine spiral housing 1.2. Moreover, a crown of guide vanes is connected upstream of the turbine impeller 1.1.

The turbine 1 has a turbine suction pipe 1.5. Said suction pipe is connected downstream of the guide vanes and generates an inlet diffuser with a manifold connected thereto and a pipework also connected thereto, which can widen the flow cross-section in flow direction of the water.

In this case, a pump 2 is facing the turbine 1 directly. The latter means that both hydraulic machines are arranged axially close to one another and there is no motor-generator between them. The pump 2 is here mounted below the turbine 1. Their configuration can also be in the reverse order, pump above and turbine below.

The pump 2 comprises a similar assembly to the turbine 1: The pump impeller 2.1 is also fitted with the shaft 3 in a torque-proof manner and includes a plurality of guide vanes. The pump 2 comprises a separate pump spiral housing 2.2, hydraulically separated from the turbine spiral housing 1.2, which surrounds the pump impeller 2.1. A crown of guide vanes 2.2.1 is preferably connected upstream of the pump impeller.

The pump 2 also presents a pump suction pipe 2.5 which can be designed as that of the turbine 1.

The turbine 1 is configured in such a way that its rated power $N_T$ is larger than the rated power $N_P$ of the pump 2. In the present case, the difference is 2.5. It means that the rated power of the turbine corresponds to 2.5× that of the pump. Larger differences can also be envisioned, for example 3 or 4. In practice, any value can be contemplated between 1 and . . . 4 or 5.

From the construction viewpoint, the differences in rated powers are induced by the sizing of the pump and of the turbine, and admittedly as regards the dimensions or the selected resistance values. The figures only represent schematically the relationships without taking into account the differences in rated power.

In the present case, both spiral housings 1.2 and 2.2 lie at a mutual distance directly on top of one another. The intermediate space 5 they formed is here free from any electrical machine. The intermediate space 5 is in this instance delineated from the spiral housings 1.2 and 2.2 facing each another. Both spiral housings 1.2 and 2.2 can be supported against one another via a supporting element.

The supporting element can be of different form. In the present case, it is designed as a cone mantle 10.1; The cone mantle is supported on the one hand against the traverse ring 1.2.2 of the turbine and on the other hand against the traverse ring 2.2.2 of the pump. A further support 10.2, likewise in a ring shape, is situated between the spiral housings 1.2 and 2.2. Supports could also be envisioned between the spiral housing of the one machine and the traverse ring of the other machine.

A further support 10.3 in the form of a cylinder is situated between the turbine lid and the pump lid. The support 10.3 advantageously generates a force compensation between both machines. A support can also be contemplated between the traverse ring of the one machine and the lid of the other machine.

As can be seen, the shaft 3 is mounted in a bearing 9. The bearing 9 can be integrated into one of the supports 10.1 or 10.3.

The following components can form a single construction unit: the turbine spiral housing 1.2, the pump spiral housing 2.2, the supporting elements 10.1, 10.2, 10.3, possibly as well the traverse rings 1.2.2 and 2.2.2 as well as the bearing 9. The three of the supporting elements aforementioned 10.1,10.2,10.3 can be present, or only one of the supporting elements or two of the supporting elements.

Figure 2:
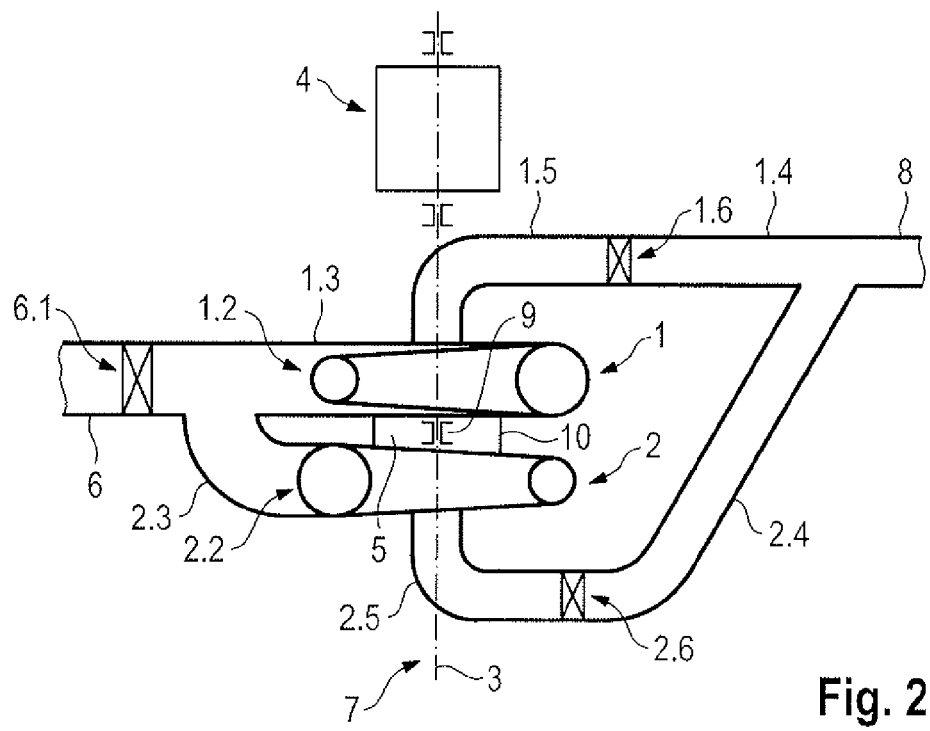
FIG. 2 shows in diagrammatical illustration of a pump turbine plant according to a first embodiment with a shaft rotating in vertical direction.

FIG. 2 shows a first embodiment of the pump turbine plant according to the invention. As can be seen, a pressure line 1.3 is connected to the turbine spiral housing 1.2 whereas a pressure line 2.3 is connected to the pump spiral housing 2.2. Both pressure lines 1.3, 2.3 emerge in a common pressure line 6, in which a common shut-off device 6.1 is situated.

The common shut-off device 6.1 in the pressure line 6 remains preferably open permanently and is closed only in case of an emergency shutdown or for maintenance purposes. This has the advantage that both spiral housings 1.1 and 2.2 are always acted upon with the same pressure, i.e. the upstream water pressure available at the upstream water and are hence not exposed to any frequent load changes.

Corresponding suction lines 1.4 and 2.4 are then respectively connected to both suction pipes 1.5 and 2.5. A separate shut-off device 1.6 and 2.6 is respectively arranged in both suction lines 1.4 and 2.4. Both suction lines 1.4 and 2.4 emerge in a common suction line 8.

An electrical machine 4, which is designed as a motor-generator, is in this instance in driving connection with the shaft 3. The latter is arranged above the turbine 1 and hence outside the intermediate space 5 axially close to the turbine. It is hence possible to insert a bearing 9 in the intermediate space 5, which is delineated by both spiral housings 1.2 and 2.2 as well as the supporting element 19, a bearing which serves for example as guide bearing or a combined thrust and guide bearing for supporting the shaft 3. To do so, the smoothness of the shaft 3 will improved further.

Figure 3:
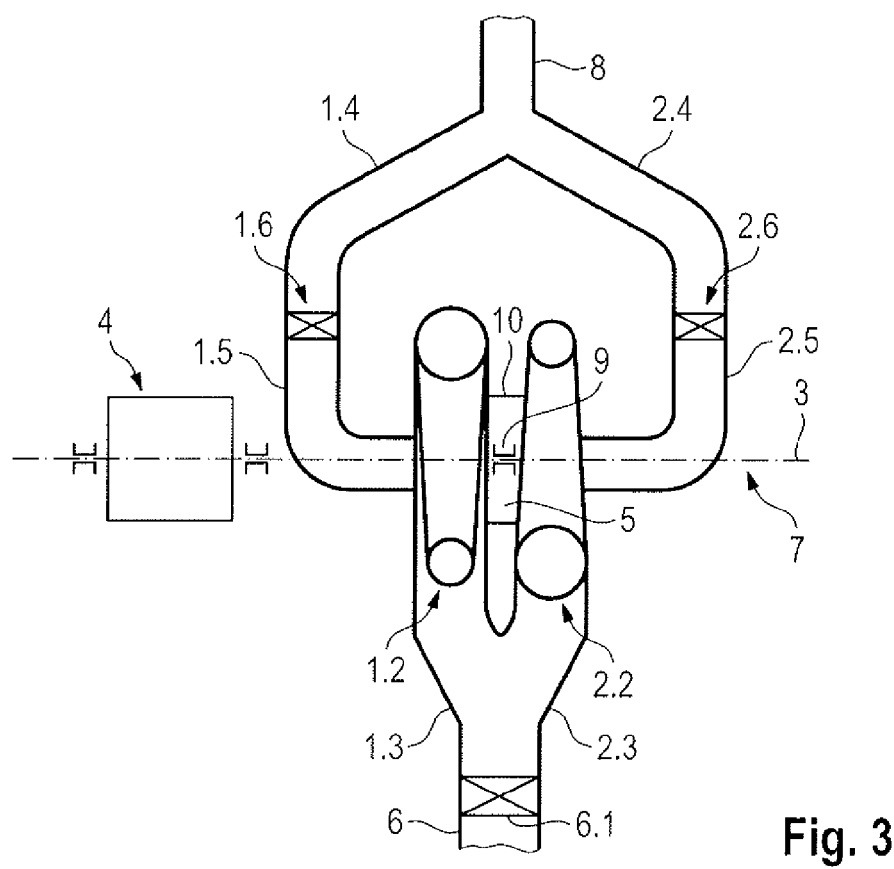
FIG. 3 shows a diagrammatic illustration of a further embodiment of the pump turbine plant with a shaft arranged in horizontal direction.

FIG. 3 shows a further embodiment of the pump turbine plant according to the invention with reference to FIG. 2, whose arrangement has been rotated only by 90 degrees to the left, so that the rotary axis 3 runs in horizontal direction and the electrical machine 4 is arranged laterally close to both hydraulic machines 1 and 2. To do so, the substantially same structural elements are designated with the same reference signs as represented in FIG. 2.

Figure 4:
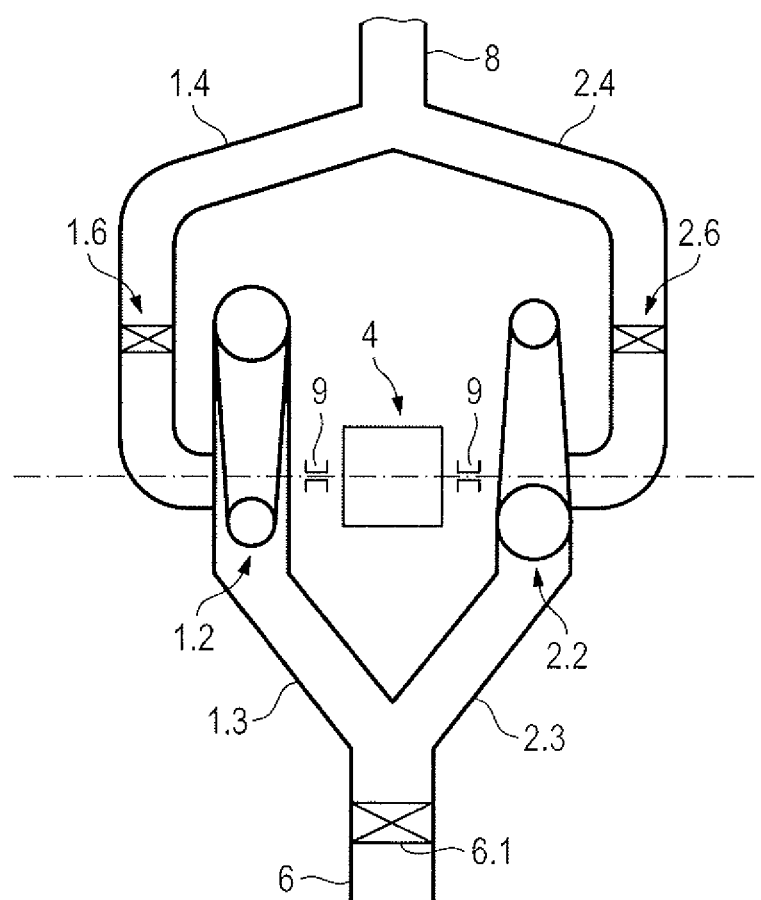
FIG. 4 shows a diagrammatic illustration of a third embodiment, in which an electrical machine is situated between both spiral housings.

FIG. 4 shows a further embodiment in which the electrical machine 4 is arranged between both said spiral housings 1.2 and 2.2. The arrangement of both spiral housings 1.2 and 2.2 as well as of the electrical machine 4 can be a strongly symmetrical one.

Preferably, both spiral housings 1.2 and 2.2 could be completed cemented in place independently of the position of the shaft 3, while remaining free-standing. The intermediate space 5 can be large enough to achieve a revision opening for maintenance or assembly and disassembly of both hydraulic machines without any problems.

The invention can be used among other things with the following construction types of plants:

Single-stage turbine with single-stage pump.—Single-stage turbine with multistage pump.—Multistage turbine with single-stage pump.—Multistage turbine with multistage pump.

Figure 5:
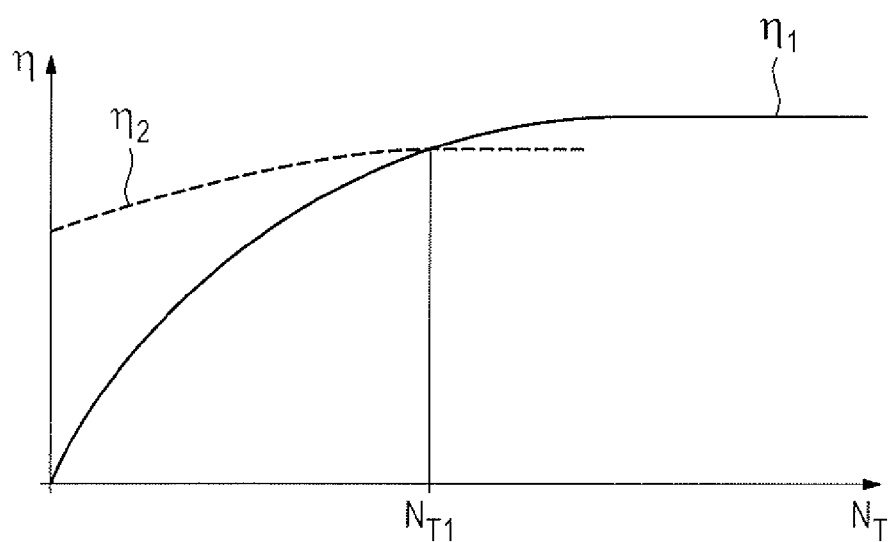
FIG. 5 shows a schematic diagram of the degree of efficiency of the turbine as well as of the turbine and of the pump in hydraulic short-circuit over the rated power of the turbine.

An operating method for the pump turbine plant should be described below. Said operating method hence relates to the operation of the turbine of the pump turbine plant and is described more in detail with reference to the diagram in FIG. 5. The diagram of FIG. 5 shows in full line the degree of efficiency $\eta_1$ of the turbine 1 over the rated power $N_T$ of the turbine 1 plotted on the X-axis. The degree of efficiency $\eta_2$ of the turbine 1 and of the pump 2 is indicated with a dotted line in the diagram, when said elements are operated in the hydraulic short-circuit. Said degree of efficiency $\eta_2$ is in the partial load range much higher than the degree of efficiency $\eta_1$ of the turbine 1 on its own.

An optimised operation of the pump turbine plant thus sets forth that in the partial load range, and indeed in particular as long as the degree of efficiency $\eta_2$ of the pump 2 and turbine 1 in operation with hydraulic short-circuit is greater than the degree of efficiency of the turbine on its own, the operation of the pump turbine plant takes place during the operation of the turbine with the turbine 1 and pump 2 in hydraulic short-circuit. The system switches from the range designated as $N_T i$ on the diagram, in which the degree of efficiency $\eta_1$ of the turbine on its own and the degree of efficiency $\eta_2$ of the turbine 1 and of the pump 2 in hydraulic short-circuit are more or less the same, to the sole operation of the turbine 1. This enables to achieve a very good degree of efficiency $\eta$ over the whole power range available of the turbine 1 during the operation of the turbine and to obtain an optimal operational behaviour in terms of stability and cavitation.

The exact range $N_T i$, in which the system switches from the partial load range with the pump 2 and the turbine 1 in hydraulic short-circuit to the sole operation of the turbine 1, hence depends among other things on the relation of the rated power $N_T$ of the turbine 1 to the rated power $N_P$ of the pump 2, similarly to other different boundary conditions. It is typically smaller than approx. 30%-60% of the rated power $N_T$ of the turbine 1.

LIST OF REFERENCE NUMERALS

1 Turbine
1.1 Turbine impeller
1.2 Turbine spiral housing
1.2.1 Guide vane
1.2.2 Traverse ring
1.3 Pressure line
1.4 Suction line
1.5 Turbine suction pipe
1.6 Shut-off device
2 Pump
2.1 Pump impeller
2.2 Pump spiral housing
2.2.2 Traverse ring
2.2.1 Guide vane
2.3 Pressure line
2.4 Suction line
2.5 Pump suction pipe
2.6 Shut-off device
3 Shaft
4 Electrical machine
6 Pressure line
6.1 Shut-off device
7 Rotational axis
8 Suction line
9 Bearing
10.1 Supporting element
10.2 Supporting element
10.3 Supporting element

The invention claimed is:

1. A method of operating a pump turbine plant including a turbine with a turbine impeller and a turbine spiral casing having a first pressure pipe, and a pump with a pump impeller and a pump spiral casing having a second pressure pipe, an electrical machine dynamically in a drive connection with a shaft, the pump turbine plant further including a hydraulic short-circuit that can be created between the turbine and the pump, wherein the turbine has a greater rated power than the pump, and wherein the turbine and the pump operate under partial load at least temporarily in the hydraulic short-circuit, the method comprising:

operating the turbine or the pump in the hydraulic short-circuit when a degree of efficiency of the pump and of the turbine in the hydraulic short-circuit is greater than a degree of efficiency of the turbine on its own.

2. The method according to claim 1, wherein:

at least one of the turbine and the pump has an adjustable guide apparatus;

a rated power $N_T$ of the turbine is up to five times larger than a rated power Np of the pump;

the turbine spiral casing and the pump spiral casing are supported against one another; and the first pressure pipe and the second pressure pipe emerge in a common pressure line.

3. The method according to claim 2, wherein the electrical machine is situated in an intermediate space between the turbine spiral casing and the pump spiral casing.

4. The method according to claim 2, wherein the electrical machine is situated outside of an intermediate space between the turbine spiral casing and the pump spiral casing.

5. The method according to claim 2, wherein the turbine spiral casing and the pump spiral casing are supported directly by a supporting element, wherein the supporting element comprises a cylindrical supporting ring or a supporting cone.

6. The method according to claim 3, wherein the turbine spiral casing and the pump spiral casing are supported directly by a supporting element, a cylindrical supporting ring or a supporting cone.

7. The method according to claim 4, wherein the turbine spiral casing and the pump spiral casing are supported directly by a supporting element, wherein the supporting element comprises a cylindrical supporting ring or a supporting cone.

* * * * *